US010384341B2

(12) United States Patent
Olea (10) Patent No.: US 10,384,341 B2
(45) Date of Patent: Aug. 20, 2019

(54) REDUNDANT PARALLEL POSITIONING TABLE DEVICE (71) Applicant: Huber Diffraktionstechnik GmbH & Co. KG, Rimsting (DE)

(72) Inventor: Gheorghe Olea, Bad Endorf (DE)

(73) Assignee: Huber Diffraktionstechnik GmbH & Co. KG, Rimsting (DE)

( * ) Notice: Subject to any disclaimer, the term of this patent is extended or adjusted under 35 U.S.C. 154(b) by 524 days.

(21) Appl. No.: 15/100,828

(22) PCT Filed: Dec. 5, 2014

(86) PCT No.: PCT/EP2014/076795
§ 371 (c)(1),
(2) Date: Jun. 1, 2016

(87) PCT Pub. No.: WO2015/082713
PCT Pub. Date: Jun. 11, 2015

(65) Prior Publication Data
US 2016/0288317 A1   Oct. 6, 2016

(30) Foreign Application Priority Data
Dec. 6, 2013  (GB) .................................. 1321539.7

(51) Int. Cl.
*B25J 9/00* (2006.01)
*B25J 17/02* (2006.01)

(52) U.S. Cl.
CPC ........... *B25J 9/003* (2013.01); *B25J 17/0266* (2013.01)

(58) Field of Classification Search
CPC ............................. B25J 9/003; B25J 17/0266
See application file for complete search history.

(56) References Cited

U.S. PATENT DOCUMENTS

| | | | | |
|---|---|---|---|---|
| 5,279,176 A | * | 1/1994 | Tahmasebi | ............... B25J 9/106 74/490.01 |
| 5,301,566 A | | 4/1994 | Tahmasebi et al. | |
| 5,656,905 A | * | 8/1997 | Tsai | ..................... B23Q 1/5462 318/560 |
| 6,047,610 A | * | 4/2000 | Stocco | ................. B25J 17/0266 74/479.01 |

(Continued)

FOREIGN PATENT DOCUMENTS

| | | |
|---|---|---|
| CN | 1730235 A | 2/2006 |
| DE | 198 40 886 A1 | 3/2000 |

(Continued)

OTHER PUBLICATIONS

J. Hong et al., Transactions of the Canadian Society for Mechanical Engineering 2013, 37 (2), pp. 161-183.

(Continued)

*Primary Examiner* — David M Fenstermacher
(74) *Attorney, Agent, or Firm* — Altman & Martin; Steven K Martin (57) ABSTRACT The present invention is related a redundant parallel positioning table device. More particularly, the present invention relates to a redundant parallel positioning table device for a precise positioning of heavy load samples, instrument and/or apparatus, e.g. in the context of diffractometer machines for synchrotron facilities.

17 Claims, 4 Drawing Sheets

(56) References Cited

U.S. PATENT DOCUMENTS

| | | | | |
|---|---|---|---|---|
| 6,330,837 | B1* | 12/2001 | Charles | B25J 11/00 |
| | | | | 74/490.06 |
| 6,575,676 | B2* | 6/2003 | Wang | B23Q 1/5462 |
| | | | | 409/201 |
| 7,172,385 | B2* | 2/2007 | Khajepour | B25J 17/0266 |
| | | | | 414/735 |
| 2005/0262959 | A1* | 12/2005 | Angeles | B23Q 1/52 |
| | | | | 74/490.01 |
| 2009/0066100 | A1* | 3/2009 | Bosscher | B25J 17/0266 |
| | | | | 294/86.4 |
| 2009/0143907 | A1* | 6/2009 | Demathelin | B25J 17/0266 |
| | | | | 700/245 |
| 2012/0137816 | A1* | 6/2012 | Carricato | B25J 17/0266 |
| | | | | 74/490.05 |
| 2014/0311271 | A1* | 10/2014 | Cao | B25J 9/0036 |
| | | | | 74/490.05 |

FOREIGN PATENT DOCUMENTS

| | | |
|---|---|---|
| DE | 10 2012 008744 A1 | 11/2013 |
| FR | 2964337 A | 3/2012 |
| FR | 2965207 A | 3/2012 |
| JP | 2001121460 A | 5/2001 |
| JP | 2004 001203 A | 1/2008 |
| JP | 2010-264526 A | 11/2010 |
| JP | 2012 051054 A | 3/2012 |
| WO | 2007/055339 A1 | 5/2007 |

OTHER PUBLICATIONS

J. Feng et al., Journal of Mechanical Science and Technology 2012, 26 (1), pp. 187-194.

S. Caro et al., Proceedings of an International Symposium on the Occasion of the 25th Anniversary of the McGill University Centre for Intelligent Machines 2010, 83, pp. 341-352.

Search and Examination Report of GB132I539.7, dated Apr. 29, 2014.

Stewart, A Platform with Six Degrees of Freedom, Proc. Institution of Mechanical Eng. (UK), 1965-1966.

Gough, Contribution to Discussion of Papers on Research in Automobile Stability, Control and Tyre Performance, Proc. Auto Div. Inst. Mech. Eng, 1956-1957.

Olea et al., Precision Hexapod—Preliminary CAD (A Work for Micro), Proc. Euspen Intl. Conf.—Delft, Jun. 2010.

Brochure for type 5021 diffractometer, HUBER Diffraktionstechnik GmbH & Co. KG.

* cited by examiner

REDUNDANT PARALLEL POSITIONING TABLE DEVICE

The present invention relates to a redundant parallel positioning table device. More specifically, the present invention relates to a redundant parallel positioning table device for a precise positioning of heavy load samples, instrument and/or apparatus, e.g. in the fields and use of diffractometer machines for synchrotron facilities.

Positioning systems and devices for the positioning of samples for different purposes have long been known in the prior art.

Some researches on new or existent materials are involving synchrotron X-ray tool and Diffractometers (Dm) machines to investigate the physical and/or chemical properties. To discover the intrinsic molecular and/or atomic structures and its behavior under different environmental conditions, the measurements in these large (microscopes) machines are based on diffraction technique. In order to simulate the real or virtual conditions (e.g. pressure, temperature, etc) for a sample, the additional instruments and/or apparatus are sometimes necessary. These could weigh several tens or hundreds of kilograms and appreciable size, and the aggregates (sample & instruments/apparatus) must be manipulated in the right position towards the incoming X-ray beam. A standard experimental process includes several operations (and/or phases)—fast set ups, alignments, calibrations, go to exactly required position, keeping the pose for relative long time (e.g. hours or days) then, to restart the whole cycle for another investigation. Following these, a required positioning device should be able to perform both, simple and complex motions with enough precision and speed owing in the same time the power for carrying the relative high load and to maintain it for relative long time. Especially, it must be able to do spherical motions around a fixed arbitrary chosen point, called rotation center C (or, pivot point P) regarding the sample center, located at a distance ($d_C$) from the instrument base.

Parallel kinematic (PK) principle has been recently more and more investigated as positioning concept based on some advantages against the standard serial (stacked) principle. The most common 6dof topology called hexapod is derived from GOUGH [V. E. Gough, *Contribution to discussion of papers on research in automobile stability, control and tyre performance Proc. Auto Div. Inst. Mech. Eng,* 1956-1957] and STEWART [D. Stewart, *A platform with six degrees of freedom, Proc. Institution of Mechanical Eng.*(*UK*), 1965-1966] works. The GOUGH-STEWART platform mechanism was applied for the first time as motion simulator [C. L. Klaus, Motion manipulator, U.S. Pat. No. 3,295,224, Jan. 3, 1967] and then latter as tool positioning in machine tools industry [P. C. Sheldon, Six-axis machine tool, U.S. Pat. No. 4,988,244, Jan. 29, 1991]. Actual hexapod structures for positioning (e.g. 6-SPS) are fully parallel kinematic mechanisms (PKM) composed from symmetric structures with six variable lengths actuators called struts arranged between two approximate hexagonal (or, disc) shapes—base and moving platform parts, respectively. The position (and, orientation) of the platform is resulting as a combination of strong coupled motions of linear actuated telescopic bars. The benefits are related with the increased pay-load, precision and dynamics, due to their intrinsic stiffer pyramidal structure. The distinctive class designed for precision positioning is called precision hexapods.

There are several proposed solutions; some of them as available products. However, when intended to be used inside of diffractometers (e.g. Type 5021 diffractometer from HUBER Diffraktionstechnik GmbH & Co. KG, Rimsting, Germany) they are exhibiting some drawbacks in relation with the required manipulation (e.g. load: >50 kg, dc=170 mm, repeatability: ±2 µm, speed: 3 mm/s) and the available Dm working space (D×A=400×420 mm, D-diameter, A-height) parameters: a) the maximum manipulated load not enough (for those fulfilling D×A, or dc), b) the rotation center point distance (dc) not inside of D×A (for all carrying a bigger load) and c) the workspace relative small (for both, above cases). Shortly, the hexapods volume, especially the heights are too big (or, too small) compared with the performances they offer for the allocated Dm space. In addition, the mounting surface of the platform for large instruments not always well prepared (e.g. large aperture, for cable management).

This is because the designers face with: a) the necessity to pack 'inside' of the actuation struts (telescopic bars) an appreciable number of components (e.g. motor, gearhead/harmonic drive, guides, sensors, etc.), b) the shape of the workspace is resulting complex, because of the intersected number and size of the actuators; c) the undesired dynamic effects for moving motorized legs, sometimes appreciable, affecting the maximum speed. And, the singularities (and, collisions) occurred must be detected and avoided for precision tasks; however, difficult to be done, as is direct related with the numbers of joints and components. Finally, the simple motions: translation—X,Y,Z (and/or rotations—Rx, Ry,Rz) are difficult to be predicted by non-parallel kinematic expert staff, when simple and fast alignment operations are to be done in the experimental rooms.

Other architectures have been investigated during the time for precision 6dof positioning tasks.

The U.S. Pat. No. 5,301,566 relates to a six degree-of-freedom parallel—(mini)manipulator having three inextensible limbs for manipulating a platform attached via three non-collinear universal joints and two-degree-of-freedom parallel drivers. By using the minimum number of actuated and supporting points, and bidirectional planar motors an increased workspace, stiffness and accuracy compared with Stewart/Gough mechanism have been claimed, beside of other advantages e.g. (direct kinematics, few components, etc). However, the static and dynamic characteristics are very much depending of the number of components (three) being one axis symmetric arranged, only.

There are also several proposals for PK mechanisms working as positioning table devices. The international patent application WO07/055339A1 describes a three-dimensional positioning table (rectangular shape) which has the ability to perform high-precision motions, as a result of combined actions of mainly two separated positioning devices. An elevating (Z) and a table plate (XYRz/PKM) devices are both connected through a planar bearing support plate and three vertical linear guides. The elevation device is including a stage system of two guided wedges which in their relative motions against a fixed support produced the lifting/down of the platform. However, these combined hybrid parallel-serial structures cannot provide whole motion capabilities spectrum (6dof). The Japanese patent application JP2012-051054 A describes a positioning table which is using three mobile supports, each of them providing a lifting/down motion through a combination of three linear guided parts on which on one, the motor is attached; and, on the second a spherical bearing. A load in space (3dof) is positioned with this tripod architecture through several moving parts and guiding means supposing to affect the general stiffness.

Redundancy is a relative new concept applied to parallel kinematic mechanisms. It increases the mechanisms capabilities of stiffness, working space, accuracy and speed for both, spatial and planar structures. Two concepts have been studied till now—the kinematic redundancy (adding a chain/leg) and the actuation redundancy (adding an active joint), respectively. The redundancy has also the advantage of avoiding singularities and to work in difficult conditions when one or more actuators are falling. However, few manipulation and/or positioning products have been released till now.

The Japanese patent application JP2010264526 A relates to a redundant spatial parallel mechanism using four pairs of two actuators having one dof each. The architecture is similar with hexapod ones based on strut actuators but with special designed interconnected joints at the top end. In order to perform the required motion task, the control function must take in to account only six suitable selected active struts. The resulting height (high) of the device related upon the actuators lengths is similar as in the hexapods case one.

The French patent application FR2965207A1 is describing a redundant parallel robot having six degrees of freedom. The mechanism can be seen as comprising four articulated kinematic closed chains each with two dof actuation from the base. A main serial chain is supported from other through a rotational joint and then it is connected to the platform through separated rotational joints including a pivotal one. The pairs of actuators are located alongside of a quadrilateral shape moving the platform and acting around the corners. The parallel type singularities are avoided. And, by using rotational motors and arms (bars) high workspaces and dexterity manipulation tasks could be delivered, but not together with precision; because the stiffness is not at its best. Improved values perhaps are obtained in the embodiment using vertical linear actuators (FR2964337 A1), but the platform size is still supposed to be much smaller than the base is.

The Chinese patent application CN1730235 relates to a redundant parallel mechanism with six degrees of freedom used as a structure for machine tool in order to increase its axial rigidity and workspace, by using four telescopic legs, each of them moving around a ring base through revolving pairs as part of their sliding blocks. The circular guides realize a large range of rotational movement and increase the attitude space, but the active joints are interposed between passive ones diminishing the maximum stiffness.

All these devices as described above have the capability to partially (less than 6 degrees of freedom) or fully (6 degrees of freedom) pose a body in space using either non-redundant (e.g. parallel or hybrid) or redundant (e.g. parallel) structures. However, none of the above devices is perfect suitable for the specific synchrotron related diffractometers applications.

It is therefore an object of the present invention to provide a 6 dof (6 degrees of freedom) positioning device with superior performances and capabilities, by being more adapted to the scope compared with the actual existent results and achievements.

A first object of the present invention is to provide a positioning table with an increased size (including the aperture) and adequate shape (flat) supporting and fixing surface for carry the specific diffractometers loads. A second object of the present invention is to provide a table which is suitable for fitting with the most demanding tight space requirements by being more compact (e.g. lower profile). A third object of the present invention is to provide a positioning table for increased precision (including stability). A forth object of the present invention is to provide a concept to increase speed. A fifth object of the present invention is to provide a method to intuitively perform automatically (or, manually) set-up simple Cartesian motions (e.g. translations and/or rotations).

The inventor of the present invention has surprisingly found that the devices according to the following aspects of the present invention provide a solution to the above described objects of the present invention and additionally provide technical effects and advantages which were unexpected and surprising in view of the prior art. These technical effects and advantages will be explained and are apparent from the examples accompanying this disclosure.

In a first aspect, there is provided a parallel positioning table device (Rd-PPT) comprising a stationary base (B) and a moveable table (T). The parallel positioning table device can be a redundant parallel positioning device table. The moveable table can be moved relative to the stationary base in all six-degrees-of-freedom (6dof). The moveable table can have a fixing surface ($\Sigma_T$). The fixing service can be a fixing surface whereupon a sample (Sp) or related bodies (Bo) for investigations can be mounted on. At least one set of four supporting legs may be symmetrically and in pairs arranged around a center of the base connected with one end to the stationary base and with other end to the movable table. One of the supporting legs can be redundant. All of the supporting legs can be 213 kinematics chains (K). Within the context of the present disclosure, redundant refers to any positioning table device having at least one set of four supporting legs, wherein at least one supporting leg is redundant in view of the other legs.

In a preferred implementation of the present invention, the parallel positioning table device can be modular. Within the context of the present disclosure, modular means that the table device comprises the stationary base, the moveable table and the supporting legs in a modular manner. The supporting legs can be provided as positioning modules (Pm). The positioning modules can be vertically in-parallel arranged with respect to one axis of symmetry (Z) and orthogonal with respect to a second axis of symmetry (X/Y), preferably as active 2dof pillars.

Each of the positioning modules can be a stacked combination of one active Ac—planar driven, and two non-active, El—inclined elevation and Gu—spherical guiding positioning units (Pu), from which the first two (Ac, El) can be compact parallelepiped blocks with the same base shape and size.

Additionally, an active positioning unit Ac can be a 2dof in-parallel actuation $\underline{A}$ unit. The actuation (A) unit may comprise four orthogonal motion axes, wherein along of two of them—adjacent ones, are acting a set of two linear actuation main parts ($\underline{A}11$, $\underline{A}12$), another ($\underline{A}'11$, $\underline{A}'12$) being redundant, perpendicularly on the sides of a common mover (M) with planar guiding surface ($\Sigma_1$).

In a preferred implementation, the parallel positioning table device's elevation positioning unit (El) can comprise a pair of parallel wedges (W) with V-type adjustable inclined guiding surfaces ($\Sigma_{21}$, $\Sigma_{22}$). The lower part (W1) of the guiding surfaces ($\Sigma_{21}$, $\Sigma_{22}$) may be fixed on the actuation (A) and the upper part (W2) may be supporting the spherical (S) positioning units, forming a V-type shape with the opposite leg of a (El) positioning unit.

A guiding positioning unit (Gu) may be a compact spherical joint (S). The compact spherical joint (S) can have convex-concave spherical shapes in contact with adjustable ($\Sigma_{31}$, $\Sigma_{32}$) surfaces. A first part can be a truncated conical pillar p with a precision calibration sphere (S) at one end. Another perpendicularly mounted on the upper side of the elevation (Pu) housing the interconnected (H1, H2) parts integrated in the bottom side of the table.

In a preferred implementation, all of the four planar 2P joints may be mounted in pairs (2×2P) on the stationary base having orthogonal axis each other (P1P3/P2P4) and substantially parallel to the stationary base surface ($\Sigma_B$) forming a coplanar actuation module (Am), as part of a 6-4-(2P)PS parallel kinematic mechanism, with only linear and spherical joints, respectively and passive joints (P) being all inclined with the same angle ($\alpha$).

The positioning modules (Pm) can be located in the middle sides, or in the corners of a stationary base square and/or movable table in terms of a central aperture (D).

In another aspect of the invention there is provided a use of the redundant parallel positioning table according to the first aspect of the disclosure to generate simple Cartesian spatial: translations—TX or TY or TZ and rotations—RX or RY or RZ motions and linear—X or Y or Z and angular—$\alpha$X or $\alpha$Y or $\alpha$Z displacements, as direct involvement of motions with equal, or equivalent displacements, by using all or only some of the corresponding active axes linear motions (tx,ty) and displacements (X,Y).

In a third aspect the present invention relates to a redundant parallel positioning table device. The redundant parallel positioning table device may comprise a stationary base and a moveable table. The moveable table may be moved relative to the stationary base in all six-degrees-of-freedom. The movable table may have a fixing surface upon which a sample or related instruments for investigations can be mounted on. Preferably, at least one set of four supporting legs are symmetrically arranged around a center of the base connected with one end to the base and other end to the movable table.

Ideally, the table positioning device may be conceived to be modular and has the supporting legs as positioning modules vertically in-parallel arranged in respect with one axis of symmetry and orthogonal in-pairs in respect with other of their axis of symmetry.

Each of the positioning modules may be a pre-determinate combination of one active and two non-active positioning units.

The table positioning device may additionally comprise two degrees of freedom in-parallel actuation components with at least two orthogonal motion axis each and a planar guiding surface.

In a preferred implementation, the table positioning device additionally comprises an elevation component based on an inclined guiding surface of which the first said bottom part is fixed on the actuation and the second part said upper is supporting the guiding unit forming a V-type shape with the opposite component from a pair.

The table positioning device may additionally comprise a guiding component with a convex-concave surface connecting the upper side of the elevation component with the bottom side of the table.

All of the active positioning units may be mounted on a planar base and in-pairs, being orthogonal each other and both substantially parallel with the base surface.

On each of the elevation units may be perpendicularly mounted guiding positioning units able to permit orientation motions and displacements for the positioning modules and by their combined work, the entire table device to be translated and/or oriented.

By choosing only part of actuation axis a positioning device with few dof than six can also be made.

In a forth aspect of the present invention there is provided a basic methodology for generating spatial motions and displacements, as combination sequences of all or some of the active translational motions and/or displacements generated by the table positioning device according to the third aspect of the present invention.

The invention will now be further illustrated by way of working examples. It is to be understood that these working examples will not limit the scope of the protection of the present invention and are intended and presented for illustrative purposes only.

EXAMPLES

In the actual context of invention precision relates with few (less than 10) micrometers (or, arc-seconds) and refers to accuracy, repeatability, resolution; and, the stability (several micrometers or arc-seconds/hour).

For the purpose of illustrating the invention the following drawings are included.

The followings notations have been used:

| Type | Kinematics/Geometry | Type | Design/Drawings |
| --- | --- | --- | --- |
| $A_i$, A | Guiding, Center platform points | Ac (A) | Actuators |
| $B_i$, $B_{i0}$ | Actuation, Fixed base points | B, (Bo) | Base, Body(e.g. instrument) |
| $C_i$, C, | Sliding points, Rotation center | El | Elevation unit |
| $a_i$, $b_i$ | Guiding, actuation points distance | F | Fixing means(e.g. screw) |
| $q_i$ | Generalized (actuated) coordinates | Gu, g | Guiding unit, means |
| J | Joint | H | Housing |
| Dof, (f) | Degree-of-freedom (joints) | L, l | Lengths |
| K | Kinematic chain | M (m) | Mover (motor) |
| P, (Pl)$_2$, S | Prismatic, Planar(2dof), Spherical Joints | Pm (Pu) | Positioning module (unit) |
| R(Rx, Ry, Rz) | Rotational Motion | p | Pillar |
| T(XYZ) | Translational Motion (Displacement) | r, D | Radius, Diameter |
| ($\Sigma$), (C) | Surface, Curve | S, s | Spherical (Joint), Sphere |
| d | Distance | Sp | Sample |
| l | Links | T | Table |
| I, . . . , IV | Kinematic Levels | W | Wedge |

-continued

| Type | Kinematics/Geometry | Type | Design/Drawings |
|---|---|---|---|
| 1, 2, 3, 4 | Actuated joints motion | α, β, γ, ψ, φ, θ | Angle/Angular Motion (displacements) |
| i, j = 1, . . . , 4 | Index (number of points, chains, etc) | ⊥, ∥ | Perpendicular, Parallel(ax) |

The architecture of a positioning device is an important factor regarding its capabilities. The chosen structure, kinematics, geometry, and optimum design affect the required final static, kinematic and dynamic parameters.

Figure 1:
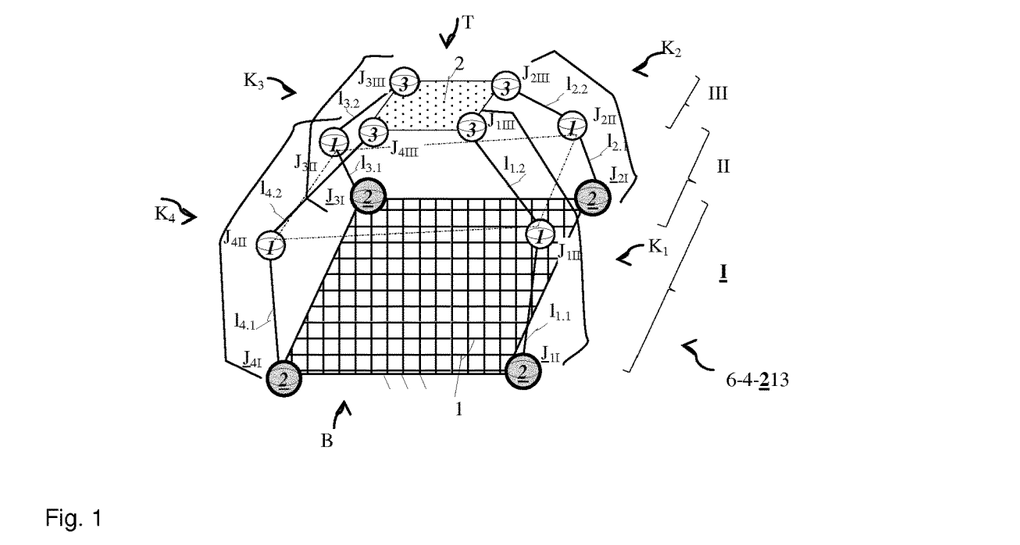
FIG. 1 represents the 6-4-2—topological concept of the redundant parallel positioning table device.

The graphical representation of a structure working as positioning table device is proposed in FIG. 1. The topological kinematic concept is fundamentally based on two rigid bodies (or, elements)—a first element (1) called the base (B), generally fixed to the ground and the second element (2) supposed to move called platform, or table (T). Both of them are connected with four identical kinematic chains or, legs ($K_i$), i=1, . . . , 4—a succession of mobile rigid pairs of links ($l_{i,1}$, $l_{i,2}$) and triplets of joints ($J_{i,j}$) arranged on three levels (j=l, . . . , lll) in the same succession regarding joints' dof ($f_{ij}$=213) starting from the primary element (1). All joints at the first level (I) situated on the base are called actuated (active) joints ($\underline{J}_{iI}$) are actuated (bold and underlined noted), whereas the remaining ones situated on levels two (II) and three (III) are non-actuated called passive joints ($J_{iII}$, $J_{iIII}$). By this symmetric structural arrangement, the total degrees of freedom or mobility (M) of the mechanism computed with Kuzbach-Grübler formula: $M=6n-\Sigma_i^j(6-fi)$ for spatial mechanisms is resulting as six (M=6), because moving parts n=9, number of joints j=12 and their degrees of freedom $f_i$=2,1 and 3, (j=1 . . . 4,5 . . . 8,9 . . . 12). The result is qualifying the kinematic mechanism (6-4-213) to have full spatial mobility; however, obtained with the price of redundancy. The degree of redundancy is coming from one chain addition ($Rd_K$=1) and the actuators number ($Rd_A$=2). In fact, the above graph is representing not only one type of the mechanisms' topology, but an entire QUATTROPOD's (QP) 6dof redundant PM family. Each of the members are depending on particular choice of joints, e.g. 1-P (Prismatic), 2-PR (R-Rotation) 3-S(Spherical). These particular very symmetric, over actuated, and over-constrained members are prone to perform heavy load stable motions with increased static and dynamic capabilities because of supplementary contact/acting points and power compared with three ones (tripod) being in the same time more versatile than six points(hexapod) structures.

Figure 2:
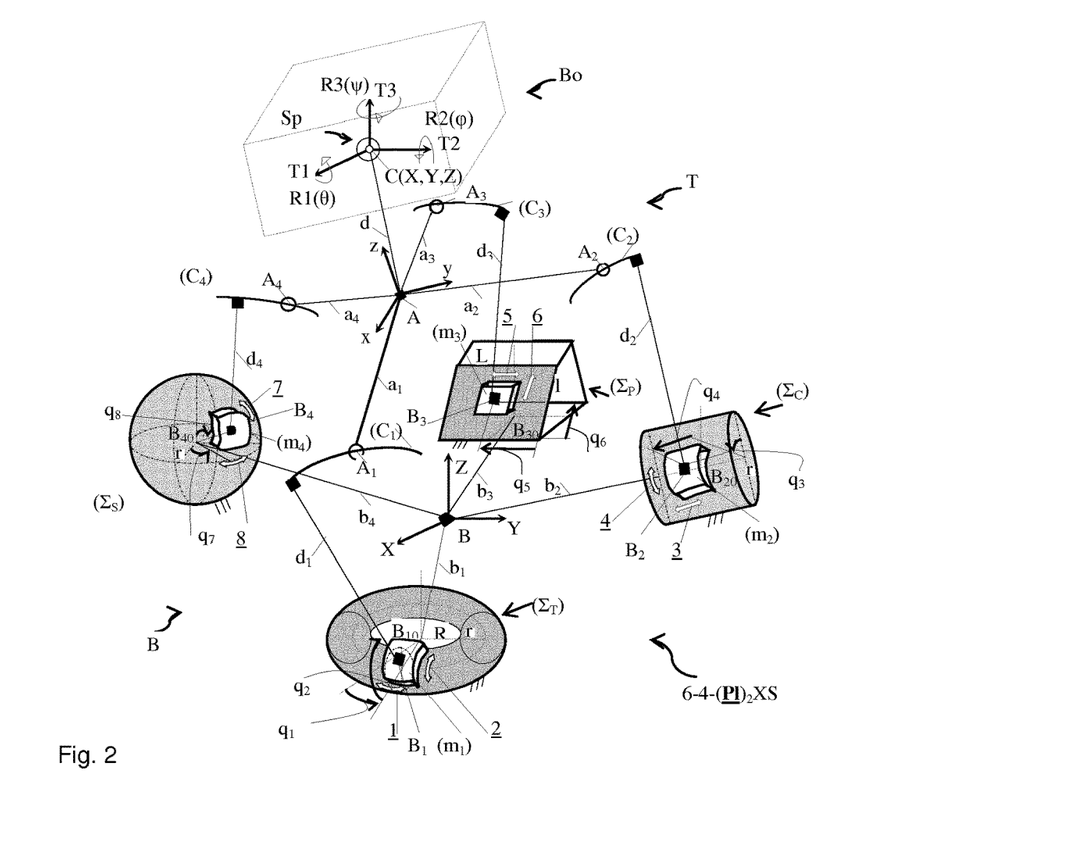
FIG. 2 represents the 6-4-(Pl)$_2$XS general kinematic model for redundant parallel positioning table device.

A general kinematic model is helping to define a particular mechanism based on the actual existent (or, developed) portfolio of kinematic joints and their general reciprocal arrangements. It is useful also to formulate the methodology of establishing the input/output (closure) equations. The above 6-4-213 graph permits to freely choose the actuated and non-actuated type of joints as: 1dof-linear (P), rotation (R), helicoidally (H), 2dof-(PP), (PR), (RR) and 3dof-spherical (S), (UR), (RRR) ones. A couple of active 2dof joints based on surface/mover principle could be used having—planar ($\Sigma_P$), spherical ($\Sigma_S$), cylindrical ($\Sigma_C$) or toroid ($\Sigma_T$) fixed surfaces, on which the linear or curvilinear pathways motions (1, . . . , 8) of the sliders are moving accordingly, as shown in FIG. 2, representing 2P, $2R_S$, PR and $2R_T$ driving joints. Through their simultaneously, or separated combined actions, each of the surface movers ($m_1$, . . . , $m_4$) or acting points $B_i$ ($X_{Bi}$, $Y_{Bi}$, $\Sigma_{Bi}$, i=1, . . . , 4) defined by a pairs of mechanisms' curvilinear generalized coordinates ($q_i$, $q_{i+1}$),i=1, . . . , 4 are changing the spherical joints (S) center $A_i$ ($X_i$, $Y_i$, $\Sigma_i$, i=1, . . . , 4) positions, which in turn, is moving the attached sample (Sp) and instrument body (Bo) generally in three spatial translational and/or rotational directions (3T/3R). With other words, this is to say that $A_i$ points are moving on curves ($C_i$), i=1, . . . , 4 having each 2dof ($l_i$—curvilinear coordinate variable, see also FIG. 3). Following this, the resulted pose—positions (XYZ) and orientation (ψ, φ, θ) values respectively, of manipulated objects is depending on: a) the actuation displacements ($q_1$, i=1, . . . , 8) and b) geometrical ($a_i$, $b_i$, li, $d_i$, L, I, R, r) parameters values for a general case of a 6-4-($\underline{Pl}$)$_2$XS mechanisms (X-undefined 1dof, ($\underline{Pl}$)$_2$—generalized curvilinear planar 2dof joints).Compact Spherical (S) joints is given a simplification in to formulate and solve the motion (position) equation. In this context, the ($C_i$) and $A_i$ are called guiding curves and guided points, respectively. The closure equations can be easy derived by expressing their coordinates in both Cartesian systems—fix (B-XYZ) and mobile (A-xyz); the input (or, output) parameters (X, Y, Z, ψ, φ, θ and $q_i$) are implicit included.

Figure 3:
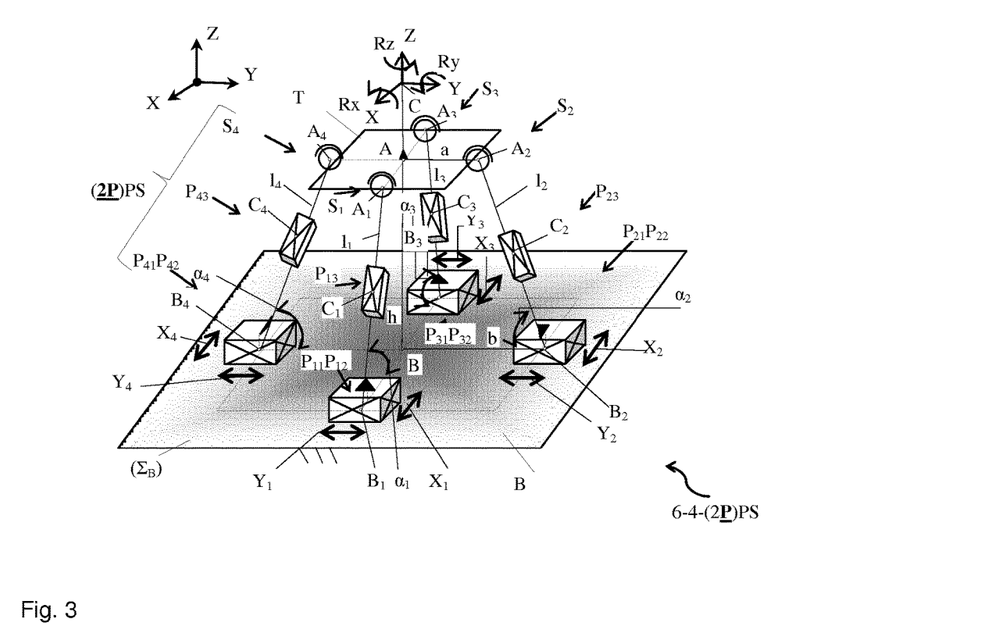
FIG. 3 represents the kinematic model of 6-4-(2P)PS mechanism for redundant parallel positioning table device.

A kinematics scheme is helping to understand the working behavior of a mechanism and to formulate the motion equations. The positioning related problems (direct/invers) are then solved based on the input/output displacements and geometric parameters. A parallel mechanisms kinematics for positioning table based on above 6-4-(Pl)$_2$XS model is represented in FIG. 3. It is consisting from a symmetric arrangement in-pairs of four identical (Pl)$_2$XS, i=1, . . . , 4, open kinematic chains, each comprising one planar actuated joint (2P) and two—prismatic (P) and spherical (S) non-actuated joints linking a quadrilateral platform like table (T) with the base (B) of the same shape. The (2P) joints are providing 2dof in a plane being located on substantially a planar base surface ($\Sigma_B$). Each of the opposite actuated joints (2P$_1$, 2P$_3$/2P$_2$, 2P$_4$) being symmetrically arranged, have all their linear motion axis orthogonally to each other (e.g. $\underline{P}_{11}{}^\perp\underline{P}_{12}$, etc) and subsequently orthogonally with other joints axis ($\underline{P}_{11}{}^\perp\underline{P}_{22}{}^\perp\underline{P}_{33}{}^\perp\underline{P}_{44}$). This symmetric combination of actuated axis is forming a general 4×2P planar Actuation module ($\underline{A}_m$), providing a simple and direct way for moving the table along each of the horizontal Cartesian planar axes—X ($\underline{X}_1$, $\underline{X}_2$, $\underline{X}_3$, $\underline{X}_4$) and Y($\underline{Y}_1$, $\underline{Y}_2$, $\underline{Y}_3$, $\underline{Y}_4$), respectively. Non- actuated opposite prismatic joints pairs ($P_{13}P_{33}/P_{23}P_{43}$) have all an identical inclined angles ($\alpha_i$, i=1, . . . , 4) in respect with one of the actuated axis. By the two sets of in-pair actuators motion through simultaneously and concurrent displacements, the platform are moving in a orthogonal direction (Z) to the previously ones (X and Y) on a V type kinematics principle based. The inclined angles can be any from 0 to π (except π/2) radian; in figure α<π/2. By simultaneously and motions of a pairs of actuated joints in the directions not related with the axis of rotation, or with another words orthogonally on rotation axis location, the result is the rotations around one of the planar orthogonal axis (e.g. —$\underline{X}_1$, $\underline{X}_3$/Ry); the same procedure applied for Rx(-$\underline{Y}_2$, $\underline{Y}_4$). The third rotational motion (Rz) is obtained by the action of all four (2P) joints in the same direction of rotation (and, in the same time)—e.g. Rz/($-\underline{X}_1$, $\underline{Y}_1$/$-\underline{X}_2$, $\underline{Y}_2$/$\underline{X}_3$, $-\underline{Y}_3$/($\underline{X}_4$, $-\underline{Y}_4$). Through this specific arrangement 6-4-(2$\underline{Pl}$)PS (or, 6-4-($\underline{PP}$)PS) a device can do some of the simple translational or rotational motions along or around tri-orthogonal directions very easy and intuitively through decoupled motor motions, which greatly simplify its control. As fundamentally is stated everywhere, the number of minimum points to position a body in space is enough to be three (3), however in this over constrained, but over-actuated parallel mechanism, the fourth actuator (4) is acting as a means for increasing the kinematics (speed/acceleration) and/or dynamic (inertia) capabilities, beside of an evident fundamental static stability. Moreover, if damage occurs somehow in a motion axis, the remaining ones could support the work till at least one (or, two) motorized axis (or, a leg) will be repaired. Note: The entire kinematics of de mechanism is built on using two types—linear and spherical joints, only. This small diversity could reduce the total manufacturing costs.

Figure 4:
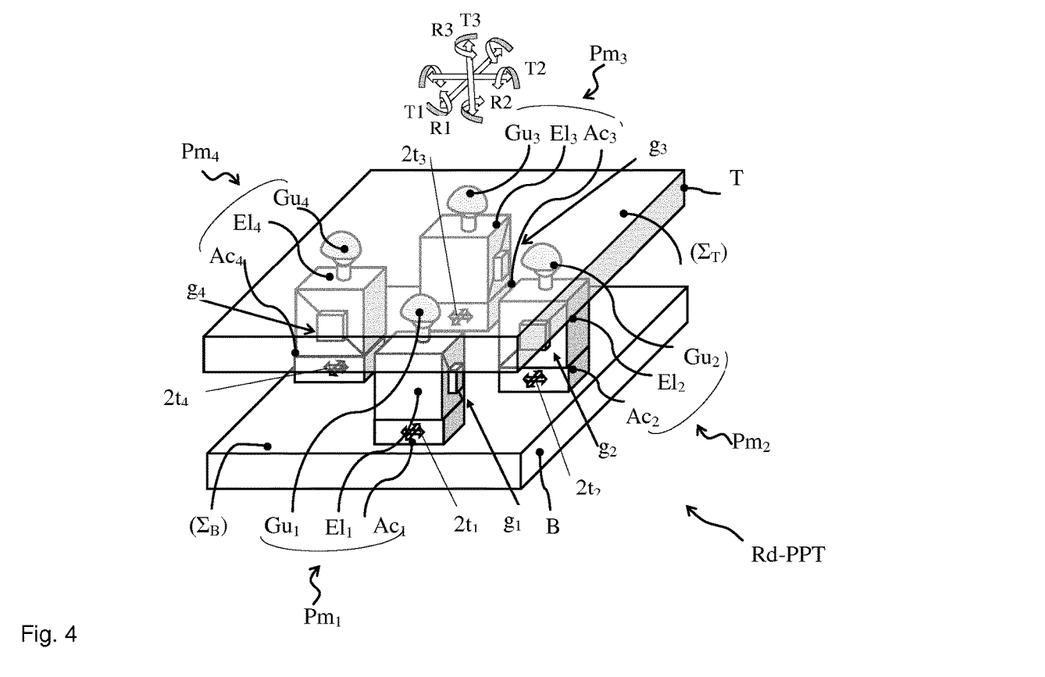
FIG. 4 is a 3D view of the redundant parallel positioning table device design concept.

A good way to materialize the kinematic principle is a key factor to fulfill the required static, kinematic and/or dynamic performances. In FIG. 4, a general design concept is proposed based on 6-4-(2$\underline{P}$)PS mechanism kinematic model. Redundant Parallel Positioning Table (Rd-PPT) design consists from a set of four active Positioning Modules (Pm$_i$, i=1, . . . , 4) arranged on a substantially planar basic surface ($\Sigma_B$) and supporting a platform-like table (T) having both polygonal (quadrilateral) shapes. Each of the (Pm) comprises two types of Positioning units (Pu$_i$, i=1, 2) in respect with their participation at the general motion; the first ones are called actuated and the second ones non-actuated (passive). The Actuation (Ac$_i$, i=1, . . . , 4 Pu are driving means providing 2dof planar motion activated by any of the actual or further developed linear bidirectional motorized drivers, as direct driven (DD), e.g. planar motors, coming from each or combination of stepping, servo, magnetically or piezo effects, or including in-parallel or serial or hybrid (parallel-serial/serial-parallel) electromechanical actuation principles, or standard (motor-gearhead-motion screw-guides) solution. The last one, in the case of a XY stage is providing high stability of motion over the time, however, not very much to be preferred, because of cable management difficulties and the resulted reciprocal errors (e.g. perpendicularity, etc.) with the direct effect on precision. (Note: DD means driving the load directly without any transmission mechanism, such as pulleys, timing belts, ball screws and gears enabling both, high-precision and high-speed positioning. For long strokes, they have to rely on advanced servo technology for assuring high stability).

The second types of Pu are including the Elevation (El) and Guiding (Gu) means, respectively.

The (El$_i$) units are based on planar wedge motion principle consisting from two—lower, fixed on (Ac$_i$) and upper, supporting (Gu$_i$) parts having reciprocal inclined planar surfaces of motion and auxiliary guiding means (g$_i$). By their relative motion, and following the result of the combined actuated unit(s) motions, the upper part will move up and down constrained by the distance of two opposite (Pm$_i$). For heavy loads and precision motions the simple way of materializing them is to have flat sliding surfaces. However, others contact surfaces, as rolling/rolled (rails) or fluid (air, liquid) based principles can be also taken in to consideration if fit with the final required performances.

The Guiding (Gui) Pu are based on spherical motion principle and are consisting from at least two parts—lower, fixed on upper part of (El$_i$) and upper, supporting and giving the opportunity the table (T) to be oriented in 3D. The relative motion of the above parts is involving a spherical guiding surface in order the table (T) to perform the required rotational motions. The type can be any from compact—rolling, sliding spherical joints (S) principle or even separated—simple rotations joints (RRR) and combination of them (UR/RU) design. Other functional principle, as air or any fluid can be also taken in to consideration depending on the applications.

Figure 5:
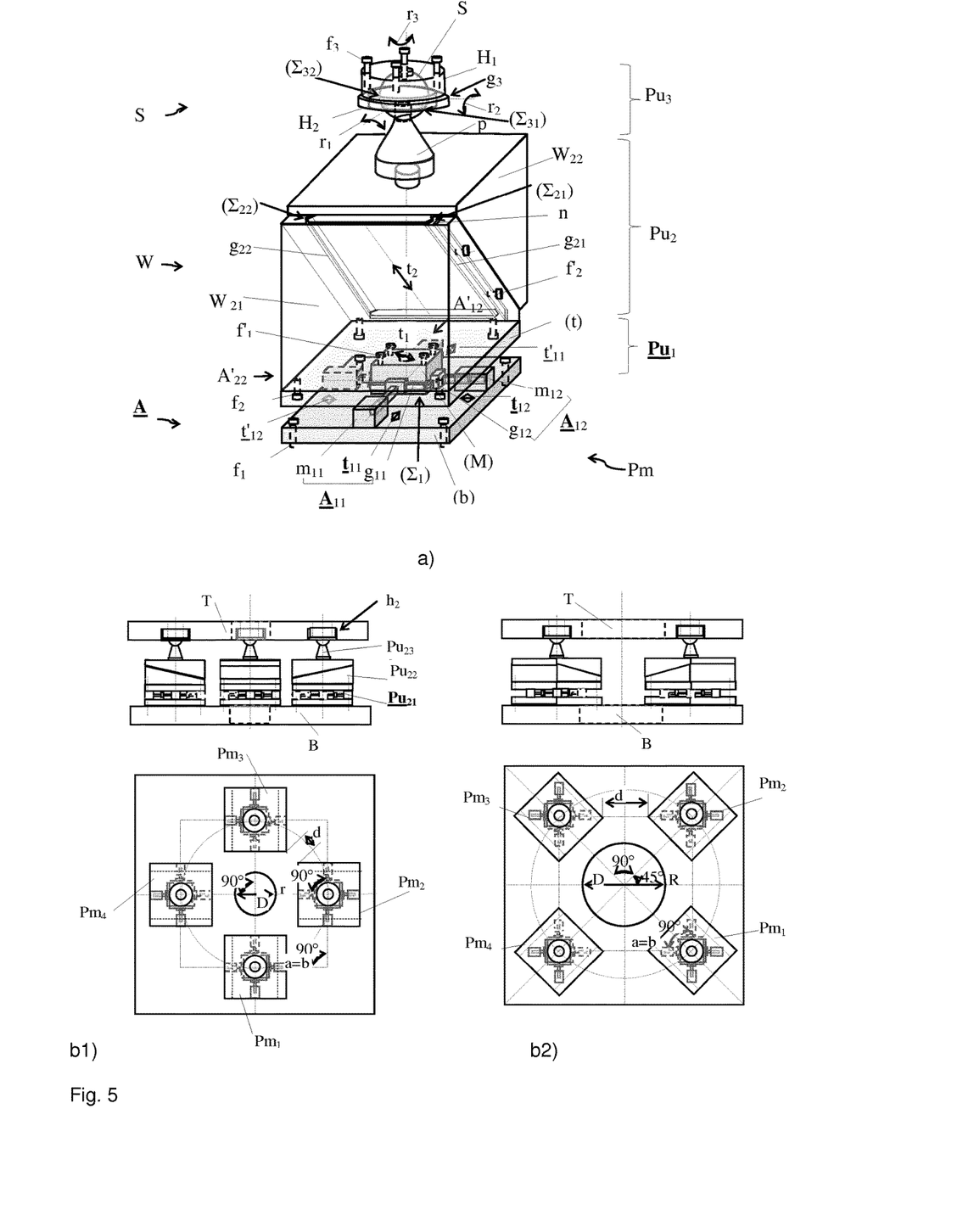
FIG. 5 is an example of a Positioning module (Pm) and two assembly embodiments.

The optimum design including the size and type of components are affecting not only the final performances but the entire characteristics and life of the device. In FIG. 5, a Positioning module (Pm) embodiment and two particular arrangements for whole devices are shown. The (Pm) is based on a stacked combination of three basic Positioning units (Pu$_i$, i=1, 2, 3): a) first one (Pu$_1$)-active/actuated (A) and b) second (Pu$_2$) and third (Pu$_3$) inactive (passive)—wedge (W) and Spherical Joint (S) types, respectively.

The ($\underline{A}$) Pu is based on in-parallel actuation principle, consisting from in principle a square shape base (b) on which a pair of two similar linear actuation units ($\underline{A}_{11}$,$\underline{A}_{12}$) having each of the motion axis ($\underline{t}_1$,$\underline{t}_2$) orthogonal each other is moving in principle a rectangular mover (M) solidary being with a table (t) of the in principle same shape with (b) and fixed through several (at least four) fixing (f$_i$,) and centered (e.g. pin, at least one) means. In addition, the (t) has in principle a flat surface supporting the next Pu (W). Each of the single actuation units ($\underline{A}_{11}$) and ($\underline{A}_{12}$) are comprising preferably a linear actuated motor (m$_{11}$), and (m$_{12}$) with a part fixed on the base and other (pusher) moving free and having a perpendicular and coplanar guide assembly (g$_1$,g$_2$) at one end with one part (preferable, the rail) fixed on (M). By pushing (or, pulling) the ($\underline{A}_{11}$) or ($\underline{A}_{12}$), the (M) is forced to move in and along each of the orthogonal directions ($\underline{t}_{11}$ or $\underline{t}_{12}$), but more specific in a (general) planar motion ($\underline{t}_1$) through their combined action. This orthogonal actuation unit (A) could be developed further, by enforcing its power through the addition of another preferably orthogonal actuation unit A'($\underline{A}'_{11}$,$\underline{A}'_{12}$). By this, each of the simple main actuation units are working in tandem with the additional ones ($\underline{A}_{11}$, $\underline{A}'_{11}$/$\underline{A}_{12}$, $\underline{A}'_{12}$) to perform heavy duty motions cycles by the full working of all four (4) actuators or helping as partial work, in the case of working only three (3), for example. This complete new actuation unit (A,A') is fitting even better with the square base (b) and table (t) shape forming a strong and compact well balanced powered unit, if necessary. There is no particular limitation in the specific uses of several other in-parallel linear actuators number, as for example three, five, etc and the corresponding base/table polygonal shape accordingly; however, the two is the minimum. In principle, the guiding means (g$_{11}$,g$_{12}$) are preferably from sliding principle, but could be any other, e.g. rolling, magnetic, etc, as well. This at the base in-parallel actuation solution, beside the advantage of being able to provide no moving cable solution with direct effect on increased precision may use specific heavy load guiding means for the mover (M), e.g. 2dof planar bearings ($\Sigma_1$). And, in the case of more than two actuators is opening the way to choose smaller size motors and components for a more compact low profile actuation module inside of the same power parameters as two units. In all cases sensors may apply for better accurate motion.

The Pu$_2$ unit consists from a wedge (W) assembly—a fixed lower part (W$_{21}$) and movable upper part (W$_{22}$) which in principle, is having the same support shape surface as similar to that of the table (t) A unit.

By the relative motion of this pair, through the specific guiding means (g$_{21}$,g$_{22}$) with V groove profile surfaces ($\Sigma_{21}$, $\Sigma_{22}$), the upper part can be precisely adjusted for smooth and accurate motion against lower one through a flexible nervure (n) sliced along one of the sliding guides ($g_{21}$,$g_{22}$) and fixed then with several (at least two) fixing means ($f'_2$), e.g. screws. The ($g_{21}$,$g_{22}$) guides could have any another form which fit the scope, e.g. angular or even other means for performing the translational resulted motion ($\underline{t}_2$), based on rolling principle e.g. balls, cross-roller rails and carriages; or, for more precise motion requirements, the air guides.

The Pu3 is the Spherical joint (S) positioning unit preferably comprising a sphere (s), e.g. calibration ball manufactured for metrological purpose with small roundness errors encapsulated (but, moving) in two houses ($H_1$, $H_2$) with reciprocal concave surfaces ($\Sigma_{31}$, $\Sigma_{32}$), and supported by a truncated conic pillar (p). ($H_1$) is holding ($H_2$) and it has an external guiding surface (g) for precise and smooth assembly with the table (T) using several (at least four) screws fixing means ($f_3$). The ($H_1$) and ($H_2$) are adjustable to permit the smooth rotation of the convex-concave spheres with the center substantially coaxial; the conical pillar support axis is perpendicularly mounted in principle on the planar support surface of upper wedge ($W_{22}$). Between the relative motions of the three surfaces the sliding contact principle is preferable to exist.

Two preferred embodiments using above ($Pm_i$) as parts of entire parallel table positioning device assemblies are materialized in FIG. 5b. The embodiments are consisting in using the preferably identic four from above modules (Pm) coupled in pairs ($Pm_1$,$Pm_3$/$Pm_2$,$Pm_4$) being in a circumferential and equidistant way arranged around a common vertical axis of symmetry of both, the base and table with the same square shapes size (a=b). The actuation/supporting legs axis of symmetry are intersecting: a) the middle-points, FIG. 5b1 and b) the corners, FIG. 5b2 of the actuation (b)/supporting (a) square, respectively. The rigid base (B) in both cases is expected to be a flat surface (plate) attached direct to a more generally flat surface of the machine basic structure (diffractometer); or, through additional device (e.g. gonio stages). Note, the base and the flat table could have also various planar polygonal shapes beside the square one, e.g. octagonal. In both embodiments, preferably the spherical joints are fixed in the table through partially through holes ($h_i$) machined in the lower table surface and the precision manufactured guiding surfaces ($g_3$) through screws. The working diagram of obtaining simple motions, e.g. X and Y translations are the same, in both variants. But for the remaining, they are as the followings; 1) Z motion is coming as—a) four (4) and b) eight (8) and 2) Rx and Ry—a) two (2) and b) eight (8) axes together work (FIG. 5.b1) with direct influence on positioning parameters and subsequently, the performances. In addition, the distance (d) between modules are different: a) $d_a$ and b) $d_b$ ($d_a < d_b$), respectively. This means the device in the b) case can be designed with smaller footprint (compact) or with larger central aperture (D) for the same footprint for easier cable management as in the diffractometers' environments very often is necessary. By the above design both, the (Pm) component and whole assembly, the parallel positioning table is exhibiting a high degree of modularization and re-configurability; and, with an acceptable cost-effective product because relative few and simple parts are involved.

The way of producing the output motions based on the afferent input motions (or, displacements) is a necessary step to understand the working behavior and to evaluate the capabilities of a new device. The method of basic operational principle is described in FIG. 6. The Rd-PPT device is supposed to be with direct drive (planar motors) in the nominal position (Pn). This means null orientation (Rx=Ry=Rz=0) and displacements for the table center (A; X=Y=0, Z=h) which is corresponding null displacements in the actuation units $\underline{Ac}_i$ ($B_i$; $\underline{X}_1=\underline{Y}_1=0$; $\underline{X}_2=\underline{Y}_2=0$; $\underline{X}_3=\underline{Y}_3=0$, $\underline{X}_4=\underline{Y}_4=0$). The basic motion sequences: a) X, Y, or Rz and b) Rx, Ry and Z imposed to the table are seen in relation with the Actuation modules ($\underline{Ac}_i$) changes. The final position (Pf) is marked as dash-dot line.

Figure 6:
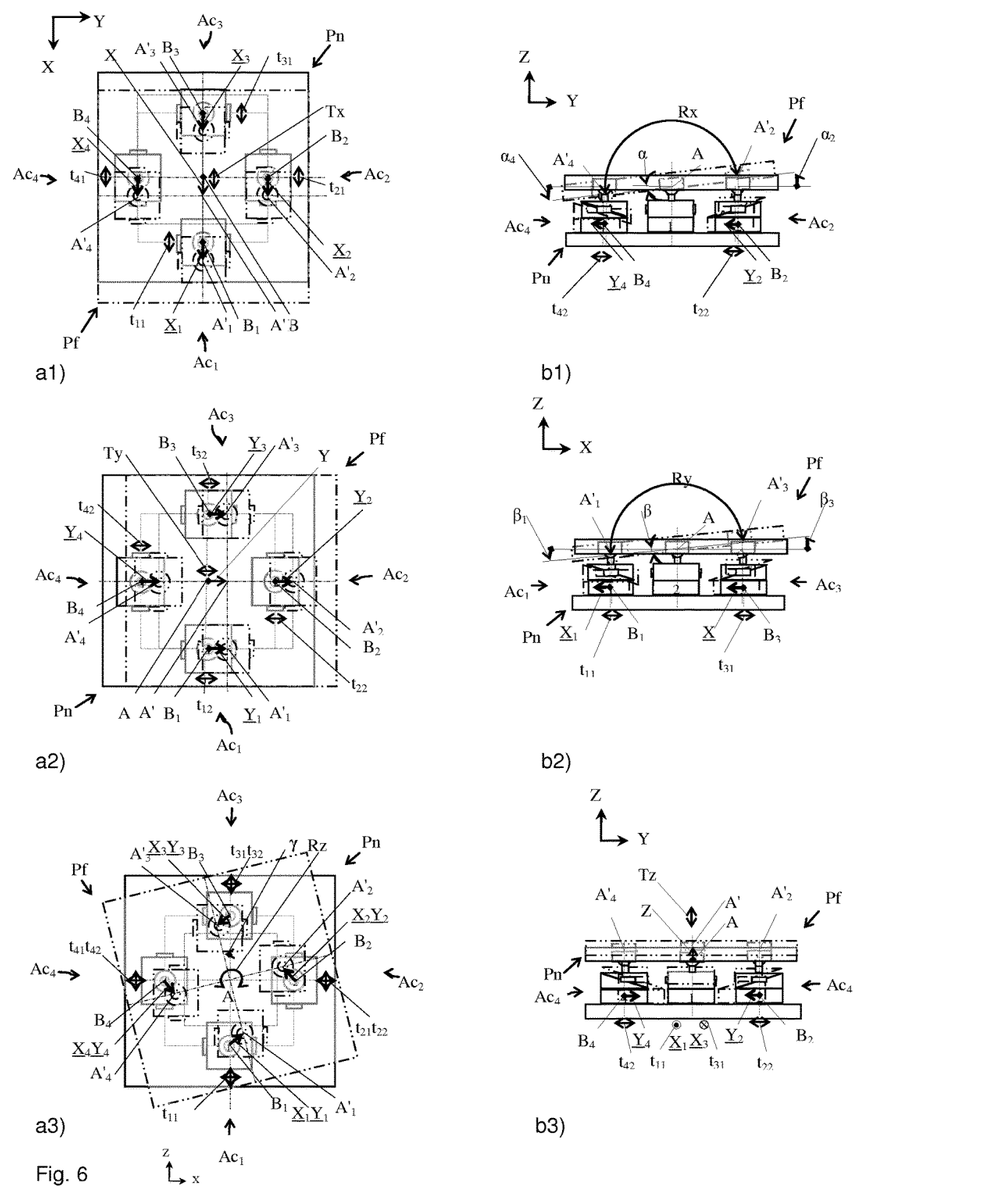
FIG. 6 is describing the basic operational principle for the positioning table device.

Back and forth translational motions along X axis (Tx) are realized by synchronized motion of all actuators along specified axis and in the same direction ($\underline{t}_{i1}$, i=1, ..., 4); the remaining motions—along Y axis ($\underline{t}_{i2}$, i=1, ..., 4) being inactivated (or, free), FIG. 6,a1. Supposing a positive displacement (X) of point (A) from initial to final (A') position, all the motors related with the same axis must be activated and in the same direction moving with the same values (X= $\underline{X}_1=\underline{X}_2=\underline{X}_3=\underline{X}_4$); or, at least three of them (the forth could be inactivated on this direction). For example, if $Ac_1$ ($\underline{X}_1$), $Ac_2$($\underline{X}_2$) and $Ac_3$($\underline{X}_3$) are moving, then $Ac_4$ ($\underline{X}_4$) could be completely free. The following relations exist: X=$\underline{X}_1$=$\underline{X}_2$= $\underline{X}_3$ (=$\underline{X}_4$); $\underline{Y}_1$=$\underline{Y}_2$=$\underline{Y}_3$=$\underline{Y}_4$=0. The same procedure applies to second orthogonal and coplanar axis (Y), FIG. 6,a2. Back and forth translational motion along Y axis (Ty) are realized by synchronized translational motions of all actuators along specified axis ($\underline{t}_{i2}$, i=1, ..., 4) and in the same direction. Supposing a linear displacement along Y axis of point A(Y), the synchronized motions of all Actuation units ($Ac_i$, i=1, ..., 4) related with the Y axis must be activated and move in the same direction (Y=$\underline{Y}_1$=$\underline{Y}_2$=$\underline{Y}_3$=$\underline{Y}_4$); or at least three of them. That means, for example, if $Ac_1$ ($Y_1$), $Ac_2$($Y_2$) and $Ac_3$($Y_3$) are activated and moves; $Ac_4$($Y_4$) can be inactivated: Y=$\underline{Y}_1$=$\underline{Y}_2$=$\underline{Y}_3$ (=$\underline{Y}_4$); $\underline{X}_1$=$\underline{X}_2$=$\underline{X}_3$=$\underline{X}_4$=0.

Vertical back and forth translational motions (Tz) of the table can be performed by simultaneously concurrent motions of all actuation unit ($Ac_i$, i=1, ..., 4), FIG. 6,b3 or at least three of them. Supposing A point displacement along Z axis (Z), then all the Actuation units (Ac) are activated and pairs move together concurrently in opposite direction towards the Z axis Z=tgα$\underline{X}_1$=tgα$\underline{Y}_2$=tgα$\underline{X}_3$ (=tgα$\underline{Y}_4$) or the point (B)—the base center; or, at least three of them (the corresponding forth one being inactivated). That means, for example, $Ac_1$(-$\underline{X}_1$), $Ac_2$(-$\underline{Y}_2$) and $Ac_3$($\underline{X}_3$) are activated and moves, and $A_4$($\underline{Y}_4$) not.

Symmetric rotations around X or Y axis (Rx or Ry) are achieved by combined back and forth linear motions ($\underline{t}_{i1(2)}$, i=1, 2) of a pair of two actuators $Ac_i$ (i=1, 2), or at least one non-collinear with the axis of rotation, FIG. 6,b1 and b2. In order to obtain a positive angular displacement α (β) simultaneously linear displacements actions in opposite directions along the correspondent orthogonal axis must be performed. For example, for Rx(α) imposes $A_2$(-$\underline{Y}_2$) and/or $A_4$(-$\underline{Y}_4$) and for Ry(β) imposes $A_1$($\underline{X}_1$) and $A_3$($\underline{X}_3$) to work for which α(β)=arctg($\underline{Z}_i$/$a_i$), where $\underline{Z}_i$=$\underline{X}_i$($\underline{Y}_i$)arctg($α_i$). Symmetric rotations around Z axis (Rz) are achieved by combined back and forth linear motions ($\underline{t}_{i12}$, i=1, ..., 4) of the entire set of four actuators $\underline{Ac}_i$ (i=1, ..., 4), or at least three of them, FIG. 6,b3. In order to obtain a positive angular displacement γ simultaneously linear displacements actions in the same direction around the Z axes must be performed. For example, for Rz(γ) imposes $\underline{A}_1$(-$\underline{X}_1$,$\underline{Y}_2$), $\underline{A}_2$(-$\underline{X}_2$,-$\underline{Y}_2$) and $\underline{A}_3$($\underline{X}_3$,-$\underline{Y}_3$) to work for which γ=arctg ($\underline{Y}_i$/$\underline{X}_i$).

As resulted from above, by choosing a number of four-legs acting and supporting points as a number in-between three points necessary for minimum stability and maximum six imposed for full motion capabilities, and by using compact bi-directional linear actuators, this parallel positioning table is providing a trade-off, between an increased accuracy, speed and stability and the dexterity, being able to deliver high power, high-energy efficient 3D positioning trajectories.

The above Redundant Parallel Positioning Table (Rd-PPT) concept can be applied for accurate, high speed, table-like automated or manually driven applications, as for example: alignment, simulation, machining, assembly, measurement, control, or testing or any other operations, from mechanical, optics, semiconductors (lithography, LCD, wafer, printing, etc) processes in manufacturing, aviation, medical or bio-technological fields including their use in extreme environments (vacuum, cryogenic, magnetic, etc).

The examples as described above provide a device and method to automatically (or, manually) pose one body or several heavy bodies in space with required precision, speed and stability. The positioning table device is based on symmetric redundant six-degrees-of-freedom spatial parallel kinematic mechanism, a member of the Quadropods family. Each pod (leg) is being built as a vertical supporting positioning module actuated by an in-parallel two-degrees-of-freedom motorized unit with motors located at the base and supporting two non-motorized—the elevation and the guiding positioning units, respectively. The elevation units consist from two opposite wedge systems arranged in pairs following the guiding positioning units from spherical bearings types. Through their combined actions, a platform-like table can be easily and intuitively moved in linear and rotational Cartesian directions. In order to manipulate heavy loads as usually in synchrotron applications they are, the device has the characteristics of compact size, low profile, and simple structure providing increased stiffness, precision, and speed positioning capabilities compared with prior art.

The invention claimed is:

1. A redundant parallel positioning table device Rd-PPT comprising:
   (a) a stationary base B;
   (b) a moveable table T movable relative to the stationary base in all six degrees of freedom 6dof, the moveable table having a fixing surface $\Sigma_T$ adapted to receive a sample Sp or related bodies Bo;
   (c) at least one set of four supporting legs, one being redundant, as 213 kinematics chains K, the legs arranged around a center of the base symmetrically and in opposed pairs, each leg having a base end connected to the stationary base and a table end connected to the movable table.

2. The redundant parallel positioning table device of claim 1 wherein the parallel positioning table device is modular with the supporting legs as positioning modules Pm, the positioning modules being active 2dof pillars, parallel to each other, vertical with respect to one axis of symmetry Z, and orthogonal with respect to a second axis of symmetry X/Y.

3. The redundant parallel positioning table device of claim 2 wherein the positioning modules Pm are located symmetrically about a central location of the movable table T.

4. The redundant parallel positioning table device of claim 2 wherein each of the positioning modules is a stacked combination of an active planar positioning unit Ac, a passive elevation positioning unit El, and a passive spherical guiding positioning unit Gu.

5. The redundant parallel positioning table device of claim 4 wherein the active planar positioning unit Ac is a 2dof actuation unit that includes a base b fixed to the stationary base, a mover M movable relative to the base in two orthogonal axes planar to the base, a linear actuator A11 moving the mover M in the first orthogonal axis, a linear actuator A12 moving the mover M in the second orthogonal axis, a redundant linear actuator A'11 moving the mover M in the first orthogonal axis, and a redundant linear actuator A'12 moving the mover M in the second orthogonal axis.

6. The redundant parallel positioning table device of claim 5 wherein the first orthogonal axis of a first opposing pair are parallel to each other and the second orthogonal axis of the first opposing pair are parallel to each other, and the first orthogonal axis of a second opposing pair are parallel to each other and the second orthogonal axis of the second opposing pair are parallel to each other.

7. The redundant parallel positioning table device of claim 4 wherein the passive elevation positioning unit El comprises a pair of wedges W21, W22 movable relative to each other on V-type inclined guiding surfaces $\Sigma_{21}$, $\Sigma_{22}$, and wherein the lower part W21 is fixed to the active planar positioning unit Ac and the upper part W22 is supporting the spherical guiding positioning unit Gu, the inclined guiding surfaces of an opposed pair of legs forming a V shape.

8. The redundant parallel positioning table device of claim 4 wherein the passive spherical guiding positioning unit Gu is a spherical joint S with a truncated conical pillar p mounted to the passive elevation positioning unit El, a precision sphere S attached to the pillar p and having convex surface $\Sigma_{31}$, a housing H1, H2 having an adjustable concave surface $\Sigma_{32}$ slidable on the convex surface $\Sigma_{31}$, the housing H1, H2 connected to the bottom side of the movable table.

9. Use of a redundant parallel positioning table according to claim 4 to generate simple Cartesian spatial translation (TX or TY or TZ) and rotation (RX or RY or RZ) motions, and linear (X or Y or Z) and angular ($\alpha X$ or $\alpha Y$ or $\alpha Z$) displacements, as direct involvement of motions with equal, or equivalent displacements, by using all or only some of the corresponding active planar positioning units.

10. The redundant parallel positioning table device of claim 1 wherein each of the 213 legs comprises a generalized 2dof planar actuation joint $(Pl)_2$, as a pair of a mover M and one spherical $\Sigma_S$, or toroid $\Sigma_T$ or cylindrical $\Sigma_C$ curvilinear fixed surfaces parts, the mover M being able to slide in two orthogonal directions (q1, q2) as part of general 6-4-($Pl)_2$XS parallel mechanisms, having the spherical joints S always on the last level, and X an unspecified 1dof joint (P, R, H).

11. A redundant parallel positioning table device comprising:
   (a) a stationary base;
   (b) a moveable table movable relative to the stationary base in all six-degrees-of-freedom, the moveable table having a fixing surface adapted to receive a sample and/or related instruments;
   (c) at least one set of four supporting legs symmetrically arranged around a center of the stationary base, each leg having a base end connected to the stationary base and a table end connected to the movable table;
   (d) the table positioning device being modular with the supporting legs as positioning modules, the positioning modules being vertical, parallel to each other and to one axis of symmetry, and orthogonal to another axis of symmetry, each of the positioning modules being a combination of an active positioning unit, a first passive positioning unit, and a second passive positioning unit.

12. The redundant parallel table positioning device of claim 11 wherein the active positioning unit provides two degrees of freedom along at least a first orthogonal axis and a second orthogonal axis.

13. The table positioning device of claim 12 wherein all of the active positioning units are mounted to the stationary base such that the first orthogonal axis of a first opposing pair are parallel to each other and the second orthogonal axis of the first opposing pair are parallel to each other, and the first orthogonal axis of a second opposing pair are parallel to each other and the second orthogonal axis of the second opposing pair are parallel to each other, all axes being parallel to the stationary base.

14. The table positioning device of claim 11 wherein the first passive positioning unit is an elevation component with an inclined guiding surface between a lower part fixed to the active positioning unit and an upper part supporting the second passive positioning unit.

15. The table positioning device of claim 14 wherein on each of the elevation units are perpendicularly mounted guiding positioning units that permit orientation motions and displacements for the positioning modules, and by their combined work, the entire table device to be translated and/or oriented.

16. The table positioning device of claim 11 wherein the second passive positioning unit is a guiding component with sliding, corresponding convex-concave surfaces and connecting the first passive positioning unit with the bottom side of the table.

17. A methodology for generating spatial motions and displacements as combination sequences of all or some of the active translational motions and/or displacements generated by the table positioning device according to claim 11.

* * * * *